United States Patent [19]

Gale

[11] 4,329,006

[45] May 11, 1982

[54] ELECTRICAL FUSE HOLDERS

[75] Inventor: James A. S. Gale, Warminster, England

[73] Assignee: Kenneth E. Beswick Limited, Somerset, England

[21] Appl. No.: 117,636

[22] Filed: Feb. 1, 1980

[30] Foreign Application Priority Data

Feb. 6, 1979 [GB] United Kingdom ................ 7904184

[51] Int. Cl.[3] ........................ H01R 13/68; H02B 1/04

[52] U.S. Cl. ........................... 339/126 R; 339/147 R; 337/213

[58] Field of Search ............... 337/213, 215, 228, 236; 339/197 R, 197 P, 119 R, 126 R

[56] References Cited

U.S. PATENT DOCUMENTS 3,339,119 8/1967 Stanback et al. ............... 337/215 X

FOREIGN PATENT DOCUMENTS 574822 1/1946 United Kingdom .
807755 1/1959 United Kingdom .
1176004 1/1970 United Kingdom .
1202346 8/1970 United Kingdom .

*Primary Examiner*—Eugene F. Desmond
*Attorney, Agent, or Firm*—Brisebois & Kruger

[57] ABSTRACT

A fuse holder for a miniature cartridge fuselink, comprises a hollow body and a fuse carrier, formed as plastic mouldings, and two spring metal contact members engagable witih the outside of the body and having central parts which project into the cylindrical chamber of the body through slots in the body wall. The construction is such that the fuse carrier can only be inserted into the body when it is oriented in one predetermined position relative to the body and, in this position, there are barriers of insulation material between the end caps of a fuselink snapped into the fuse carrier and the potentially live electrical terminals on the body. When the fuse carrier is fully inserted into the body, it can be rotated through one half turn to engage the end caps of the fuselink with the contacts. The fuse holder prohibits a user from touching any live terminals, and the end caps of the fuselink cannot engage the contacts of the holder while the fuse carrier is being inserted into or removed from the holder.

7 Claims, 5 Drawing Figures

ELECTRICAL FUSE HOLDERS

BACKGROUND OF THE INVENTION

The present invention relates to a fuse holder for electrical cartridge fuselinks and, more particularly, for miniature cartridge fuselinks. Such holders are permanently connected in an electrical circuit to be protected and permit a cartridge fuselink to be readily connected or clipped into the circuit and replaced, when necessary.

Recent legislation on safety requirements for electrical apparatus has made it assential that fuse holders for cartridge fuselinks be constructed so as to make it difficult for a user to touch any live terminals on the fuse holder, when installed, or for the end cap terminals of the fuselink to be in contact with live electrical terminals or contacts of the holder, whilst the fuselink is being inserted into, or removed from, the holder.

SUMMARY OF THE INVENTIION

It is an object of the present invention to provide a fuse holder for a cartridge fuselink in which the above safety requirements are met and which complies with the latest International specifications for such holders.

The invention consists in a fuse holder for a cartridge fuselink, comprising a hollow insulating body having a substantially cylindrical internal chamber and a part-circular opening at one end, an insulating fuse carrier having a receptacle for the cartridge fuselink and a configuration which permits the receptacle to be inserted through the part-circular opening only when the carrier is oriented in a predetermined position relative to the body, whereby the receptacle can be inserted into the chamber through the part-circular opening and the carrier can be turned to lock the carrier to the body, said receptacle being arranged to mount the fuselink eccentrically with respect to the axis of the body chamber, and electrical contacts disposed on the body and engagable by the end cap terminals of the fuselink mounted in the receptacle when the carrier is turned to lock the carrier to the body.

In the predetermined position in which the receptacle of the fuse carrier can be inserted into the body chamber, the end caps of a fuselink mounted in the receptacle are not engagable with the body contacts and there may be a barrier of insulating material between the end caps and the potentially live contacts on the body. When fully inserted, the carrier is turned relatively to the body so as to move the end caps of the fuselink into engagement with the body contacts and lock the carrier in place. The engagement between the end caps and the body contacts is direct with no intermediate metal parts.

The fuse holder can be made effectively fool-proof in that the body can be constructed to prohibit fingers from being inserted into the body, when the fuse carrier is removed, and the fuse carrier must be fully inserted and locked to the body before the fuselink is connected into the electrical circuit.

The body and the fuse carrier may be formed as plastic mouldings and the body may be designed to fit a standard punched panel hole and to be retained therein by any suitable means, such as, a nut screwed onto the exterior of the body behind the panel. In use, the body may be securely retained in an instrument panel and has its electrical contacts connected to an electrical circuit.

Conveniently, the fuse carrier includes a neck part at one end of the fuse receptacle, which engages with the part-circular opening in the body and is turnable therein, when the carrier is fully inserted into the body. This neck may be configured so as to restrict the fuse carrier to turning movement through a predetermined angle in one direction in order to connect the fuselink to the body contacts. The fuse carrier may also include a head on the outer end of the neck part which abuts the adjacent end of the body when the carrier is fully inserted. This head may abut a flange on the adjacent end of the body.

The fuse receptacle may comprise part-circular flanges at opposite ends corresponding to the particular configuration of the body opening, a recess betweeen these end flanges for containing the fuselink, and clip means for retaining the fuselink in the recess. When the carrier is inserted into the body, the receptacle end flanges may engage the internal periphery of the chamber to guide and support the carrier within the body chamber.

The body may have slots for the electrical contacts formed in one side thereof adjacent the positions occupied by the end caps of the fuselink when the carrier is locked to the body. These slots open into the internal chamber of the body and the contacts are mounted so as to project into the slots and to be engagable by the end caps when the carrier is turned to lock the carrier to the body and connect the fuselink in circuit. Preferably, each electrical contact on the body is a spring contact having arms snapped into engagement with opposite sides of the body and a central part projecting into the associated slot and shaped to produce a latching action in cooperation with the adjacent end cap, when the carrier is turned. For example, the central part of each contact may be bent into the form of a notch which engages the circumference of the adjacent end cap when the carrier is turned to connect the fuselink in circuit.

With the invention, the number of components for the fuse holder may be kept to a minimum in order to reduce tooling, handling and assembly costs, and the snap together assembly of the body contacts is also suited to low cost production techniques.

BRIEF DESCRIPTION OF THE DRAWINGS

In order that the present invention may be more readily understood, reference will now be made to the accompanying drawings, in which.

DESCRIPTION OF THE PREFERRED EMBODIMENT

Figure 1:
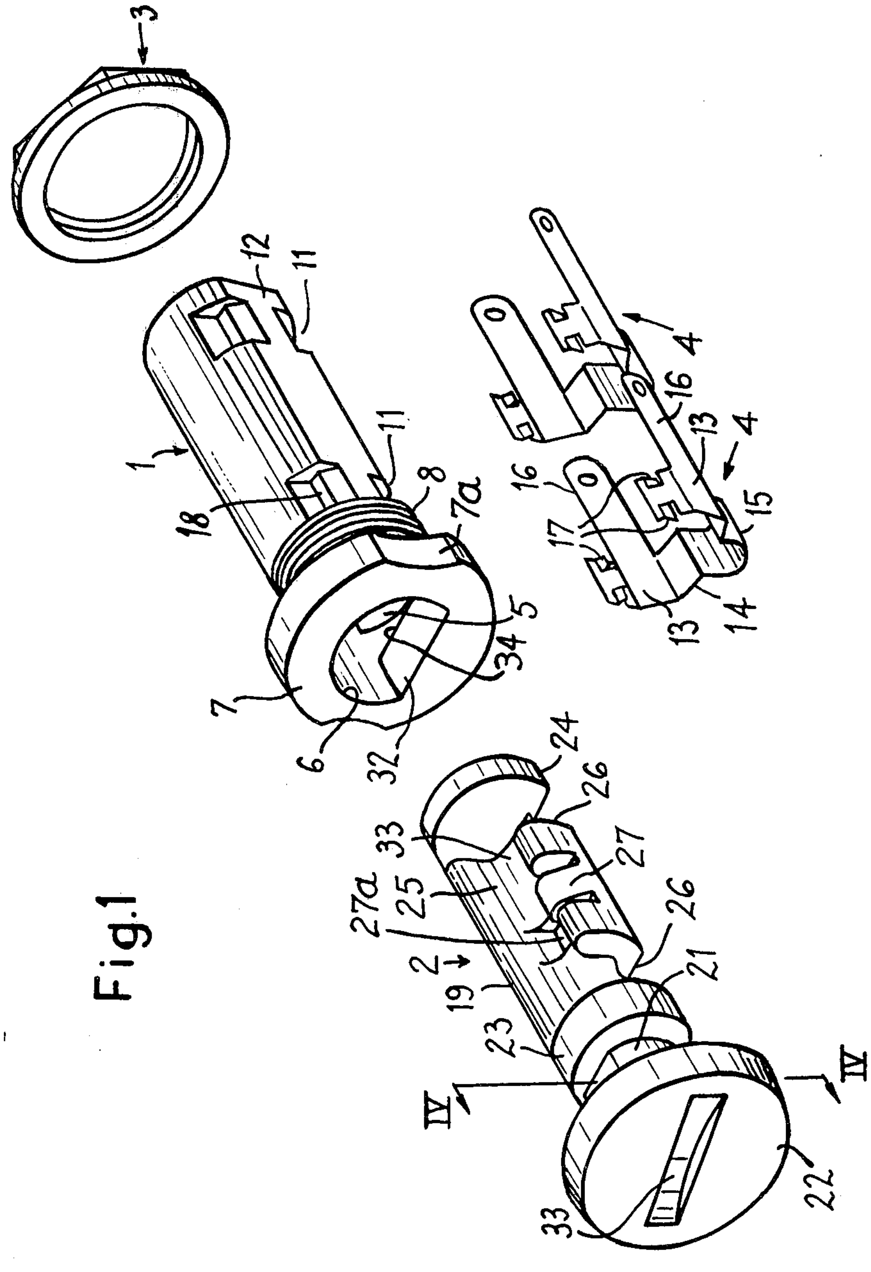
FIG. 1 is an enlarged, exploded, perspective view of a fuse holder constructed in accordance with the invention.

Referring to FIG. 1 of the drawings, the fuse holder comprises a hollow body 1, a fuse carrier 2, a nut 3 and two identical, metal electrical contact members 4. The body and fuse carrier are made from insulating material and are, conveniently, plastics mouldings.

Figure 2:
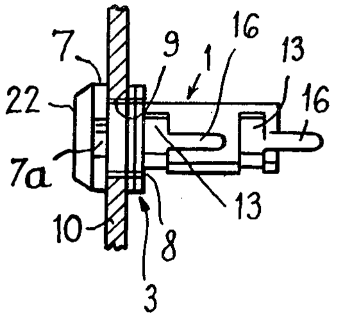
FIG. 2 illustrates a section through a panel showing the assembled fuse holder mounted therein.

The body 1 is of generally tubular configuration and has a substantially cylindrical internal chamber 5 and a part-circular opening 6 at one end through which the fuse carrier 2 is inserted into the chamber. The opening 6 has a shape conforming to a part of the circular cross-section of the chamber 5 and is somewhat larger than a semi-circle. The opening is surrounded by a generally circular flange 7 which has diametrically opposite notches 7*a* to facilitate removal of the fuse carrier from the body and behind which the body has a threaded portion 8 for engaging with the nut 3 so as to enable the body to be clamped in a hole 9 punched in a supporting panel 10 in the manner illustrated in FIG. 2. Two circumferentially extending slots 11 for the contacts 4 are moulded in the wall 12 of the body adjacent its opposite ends and open into the chamber 5.

Each contact member 4 is a spring contact and comprises a pair of arms 13 for embracing opposite sides of the body and a central part 14 which is disposed in the associated slot 11. The central part of the contact is bent to form a notch 15. The arms 13 are formed with terminal portions 16 which extend axially along opposite sides of the body and via which the contact can be connected into an electrical circuit. The upper ends of the arms 13 are formed with inwardly projecting tabs 17 which engage with rebates 18 moulded in the external surface of the wall 12 of the body, when the contact 4 is pushed onto the body with its arms embracing opposite sides thereof. The tabs 17 snap-fit into the rebates 18 and retain each contact in position on the body with the central, notched part 14 projecting into the associated slot 11.

The fuse carrier 2 comprises a receptacle part 19 for holding a miniature cartridge fuselink 20 (FIGS. 3*a* and 3*b*), and a neck part 21 connecting one end of the receptacle to a disc-shaped head 22 of the same diameter as the body flange 7. The receptacle part has an external or peripheral configuration corresponding to the shape of the opening 6 in the body. It has part-circular end flanges 23,24 complementary to this opening at opposite ends of a recess 25 for receiving the fuselink. The external configuration of the recessed part of the receptacle conforms to the bottom peripheral portion of the opening 6 and, when mounted in the recess 25, the fuselink is disposed eccentrically and projects above opposite sides of the recess, but to an extent less than the end flanges. At one side, the recess has slots 26 which facilitate engagement of the end caps of the fuselink with the electrical contacts 4. The fuselink is retained in the recess by means of a clip member 27 moulded integrally with the receptacle and disposed on the same side of the receptacle as the slots 26. An opening 27*a* in the bottom of the receptacle adjacent the clip member facilitates removal of a fuselink from the receptacle.

Figure 3A:
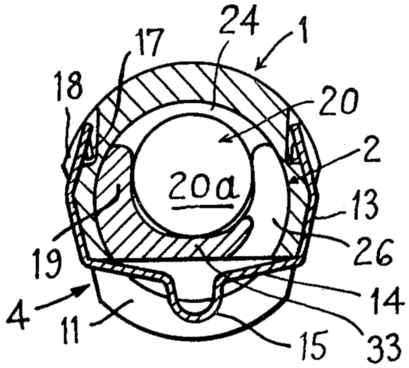
FIGS. 3*a* and 3*b* illustrate enlarged cross-sectional views through the assembled holder, complete with a fuselink, when the carrier is (a) initially inserted into the body and (b) turned to connect the fuselink in circuit.
Figure 4:
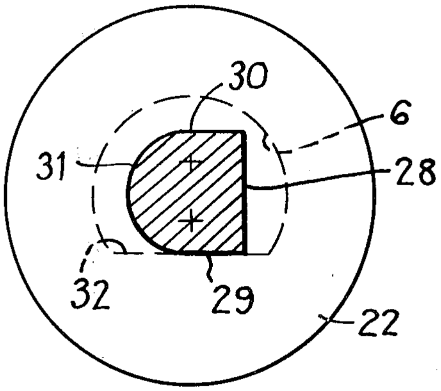
FIG. 4 is a cross-section on the line IV—IV of FIG. 1.

The neck part 21 which connects the end flange 23 to the head 22 of the fuse carrier, is of D-shaped cross-section, as shown in FIG. 4, and engages with the opening 6 in the body when the fuse carrier is fully inserted into the body. The neck part is oriented so that the upright side 28 of the D shape is substantially perpendicular to the straight bottom edges of the end flanges 23,24 and it has prominent stright portions 29,30 connecting the curved portion 31 of the D to opposite ends of the upright side 28. When the carrier is inserted into the body, the straight portion 29 (FIG. 4) initially rests in contact with straight bottom side 32 of the opening 6 and, when the carrier is turned in a clockwise direction, as seen in FIGS. 1 and 3*a*, the neck part can turn in the opening 6 through 180°. It turns on the curved portion 31 until the straight portion 30 contacts the bottom side 32 of the opening. The D-shape of the neck part restricts the carrier to 180° of turning movement in one direction.

The head of the fuse carrier has a screw driver slot 33 to facilitate turning of the fuse carrier.

Figure 3B:
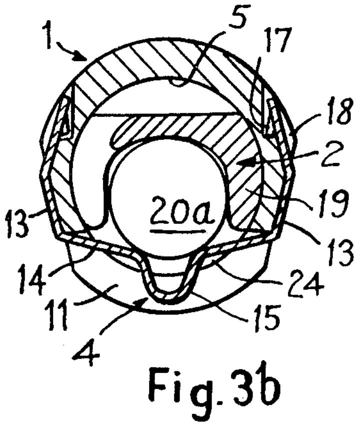

The part-circular opening 6 in the body and the complementary peripheral configuration of the fuse carrier ensure that the carrier can be inserted into the body only when the carrier is oriented in one predetermined position relative to the body. In this position, there are barriers 33 of insulating material between the end cap terminals of the fuselink disposed in the receptacle 19 and the potentially live electrical contacts 4 of the body. When the fuse carrier is fully inserted into the body, its head 22 is concentric with and abuts the flange 7 and the relative positions of the carrier, fuselink and the internal chamber of the body are as shown in FIG. 3*a*. As also shown in the latter figure, a part of the carrier isolates the fuselink from the electrical contacts 4. The end flanges 23,24 of the carrier receptacle engage the inside surface of the body chamber 5 and are turnable thereon, whilst the neck part 21 engages in the opening 6 and can turn therein, as described above. In the fully inserted position, the carrier is turned through one-half turn (180°), in a clockwise direction, as seen in FIG. 3*a*, whereupon the end caps 20*a* of the fuselink, which is disposed eccentrically with respect to the axis of the cylindrical body chamber 5, move into engagement with the contacts 4 of the body, as shown in FIG. 3*b*. In this position, the straight portion 30 of the D-shaped neck part engages the straight bottom side 32 of the opening to prohibit further clockwise rotation of the carrier and serves to index it in its properly engaged position. The end flange 23 of the carrier engages behind the shoulder 34 formed by the bottom side 32 of the opening 6 so as to lock the carrier in the body and prevent it from being withdrawn, unless it is deliberately turned back to the insertion and withdrawal position shown in FIG. 3*a*. And the notches 15 of the contacts exert a latching effect on the end caps of the fuselink and, hence, on the carrier, so as to resist turning movement of the carrier and accidental release.

Whilst a particular embodiment has been described, it will be understood that modifications can be made without departing from the scope of the invention, as defined by the appended claims.

I claim:

1. In a fuse holder for a cartridge fuselink, including a hollow insulating body having a substantially cylindrical internal chamber disposed between opposite ends of said body and having its axis intersecting said ends, and an insulating fuse carrier slidable axially within said chamber through an opening in one of said ends of said body and turnable, when fully inserted therein to lock said carrier in said body, said fuse carrier having a receptacle for a cartridge fuselink arranged so as to engage end cap terminals of said fuselink with electrical contacts means mounted on the body when the carrier is turned to lock said carrier in said body;

the improvement which permits said fuse carrier to be completely separable from said body, whilst restricting access to said internal chamber, and prohibits engagement of said fuselink with said contact means until said fuse carrier is fully inserted into said chamber, and which comprises in combination:

(a) chord-like shoulder means at said one end of said body defining a segmental-shaped opening providing access to said chamber substantially conforming to a part of the cross-section of said cylindrical chamber, (b) said fuse carrier having an external configuration adapted to permit at least a part of said carrier to be inserted into said body chamber through said segmental opening when said carrier is oriented in a predetermined position relative to said body, (c) means on said fuse carrier part defining a receptacle for said cartridge fuselink, said receptacle being arranged to mount said fuselink with its axis eccentrically disposed with respect to said axis of said cylindrical internal body chamber, (d) means on said fuse carrier engagable behind said chord-like shoulder means when said carrier part is inserted into said body chamber, through said segmental opening, and said carrier is turned, whereby to lock said carrier in said body, and (e) insulating barrier portions associated with said fuselink receptacle of said carrier and arranged to be disposed between said end caps of said fuselink and said contact means as said fuse carrier is inserted into said internal body chamber.

2. A fuse holder as claimed in claim 1, wherein said receptacle of said fuse carrier comprises segmental flanges at the inner and outer ends thereof, said segmental flanges being substantially complementary in shape to said segmental body opening and being engagable with the internal surface of said body chamber, when said fuse carrier is inserted therein, to guide and support said carrier in said chamber, and wherein said outer end flange comprises said means for engaging behind said chord-like shoulder means to lock said carrier in said body.

3. A fuse holder as claimed in claim 1, wherein:

(a) said receptacle comprises segmental flanges at opposite ends, a recess between said end flanges adapted to receive a fuselink, and clip means for retaining said fuselink in said recess, (b), said receptacle end flanges are of complementary shape to said segmental body opening and are engagable with the internal surface of said chamber when said fuse carrier is inserted into said body so as to guide and support said carrier within said chamber, (c) one of said receptacle end flanges adjacent said segmental body opening is engagable behind said chord-like shoulder means, when said fuse carrier is inserted into said body and turned, whereby to lock said fuse carrier in said body, (d) a neck part of generally D-shape cross-section projects from said one receptacle end flange and is arranged so that the upright of said D is substantially perpendicular to the chordal side of said segmental body opening in said predetermined position in which said fuse carrier is inserted into said body, the inserted carrier being turnable about the curved portion of said D, through approximately one half turn, to connect said fuselink to said contact means whereupon the upright of said D is again positioned substantially perpendicular to said chordal side of said opening, whereby said neck part restricts said carrier to one half turn of movement in one direction, (e) a head is formed on the projecting end of said neck part and is arranged to abut the adjacent end of said body when said carrier is fully inserted into said body, (f) said body has slots for said contact means in one side thereof adjacent the positions occupied by the end caps of said fuselink when said carrier is locked in said body, said slots opening into said body chamber, and (g) said contact means is mounted so as to project into said slots for engagement by said end caps when said carrier is turned to lock said carrier in said body, and (h) means for securing said body in a hole in a panel.

4. A fuse holder as claimed in claim 1, wherein said fuse carrier includes a neck part projecting from one end of said receptacle, said neck part being arranged to engage with said segmental opening of said body and being turnable therein when said carrier is fully inserted into said body, and said neck part being constructed so as to restrict said fuse carrier to turning movement through a predetermined angle in one direction in order to connect the fuselink to said contact means.

5. A fuse holder as claimed in claim 4, wherein said neck part is of generally D-shape in cross-section and is arranged so that the upright of the D is substantially perpendicular to the chordal side of said segmental opening in said predetermined position in which said fuse carrier is inserted into said body, the inserted carrier being turnable about the curved portion of the D, through one half turn, to connect said fuselink to said contact means, whereupon the upright of the D is again positioned substantially perpendicular to said chordal side of said opening, whereby said neck part restricts said carrier to one half turn of movement in one direction.

6. A fuse holder as claimed in claim 1, wherein said body has slots for said contact means in one side thereof adjacent the positions occupied by the end caps of a fuselink when said carrier is locked in said body, said slots opening into said body chamber, and wherein said contact means are mounted so as to project into said slots for engagement by said end caps when said carrier is turned to lock said carrier in said body.

7. A fuse holder as claimed in claim 6, wherein each contact means comprises a spring contact having arms snapped into engagement with opposite sides of said body and a central part projecting into the associated slot, and wherein each contact means is adapted to produce a latching action on the adjacent end cap of a fuselink, when said carrier is turned to engage the fuselink with said contacts, so as to resist turning movement of said carrier and accidental release thereof.

* * * * *